Figure 1:
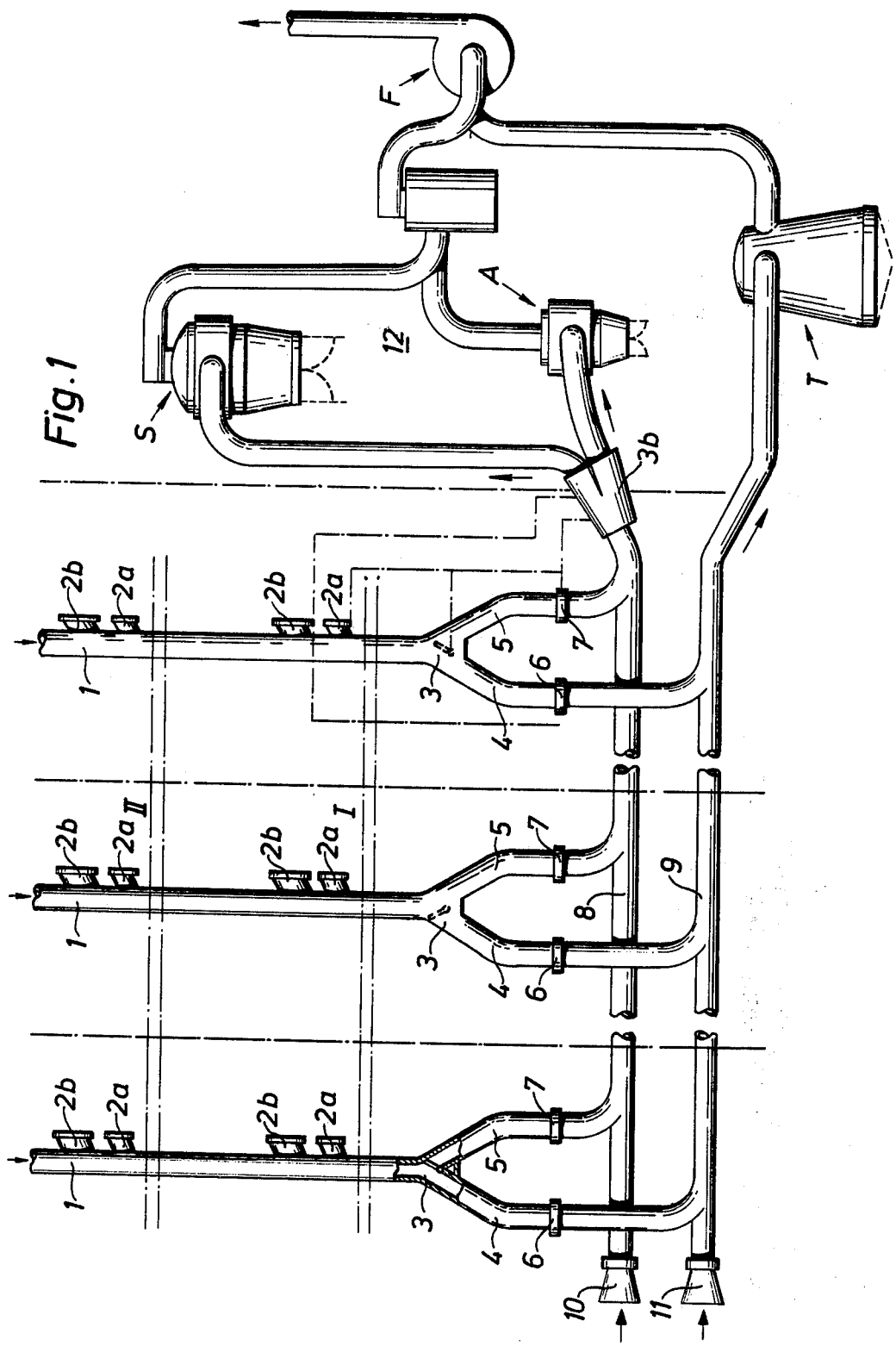

United States Patent [19]
De Feudis

[11] 3,951,461
[45] Apr. 20, 1976

[54] PNEUMATIC CONVEYING PIPE SYSTEM FOR COLLECTION AND INTERMITTENT CONVEYANCE OF DIFFERENT TYPES OF GOODS

[75] Inventor: Sergio De Feudis, Nacka, Sweden

[73] Assignee: Aktiebolaget Svenska Flaktfabriken, Nacka, Sweden

[22] Filed: Aug. 1, 1973

[21] Appl. No.: 384,447

[30] Foreign Application Priority Data
Aug. 25, 1972 Sweden............................ 11079/72

[52] U.S. Cl.................................... 302/27; 302/28
[51] Int. Cl.².......................................... B65G 51/02
[58] Field of Search .............. 302/2, 11, 12, 13, 27, 302/28, 17, 36, 39, 59; 193/33, 34; 243/4, 5, 16 R, 17, 18, 28, 29, 30, 31, 1; 209/122, 123, 73, 74 R

[56] References Cited
UNITED STATES PATENTS

| | | | |
|---|---|---|---|
| 564,427 | 7/1896 | Jacques.................................. | 243/5 |
| 1,814,947 | 7/1931 | McGuinness...................... | 243/16 R |
| 2,052,597 | 9/1936 | Beckmann ...................... | 243/16 R X |
| 3,490,813 | 1/1970 | Hallstrom ......................... | 302/28 X |

FOREIGN PATENTS OR APPLICATIONS

| | | | |
|---|---|---|---|
| 332,968 | 8/1930 | United Kingdom................... | 302/27 |
| 1,223,279 | 2/1971 | United Kingdom................... | 302/17 |

Primary Examiner—Evon C. Blunk
Assistant Examiner—James L. Rowland
Attorney, Agent, or Firm—Howson and Howson

[57] ABSTRACT

A system for pneumatically transferring different types of goods through common piping. The system operates automatically to direct one type of goods to one container, for example goods such as trash which is to be held for destruction, and the other type of goods to another container, for example goods such as laundry which is to be held for recycling. The automatic routing of the goods is preferably controlled by separate inlets for the two types of goods, such that the goods inserted into one inlet are automatically routed to one container and goods inserted into the other inlet are automatically routed to the other container. The system provides an intermediate collector for each type of goods adjacent the inlets so that the goods deposited in the respective inlets may be separately accumulated prior to being transferred to the containers. Three systems are illustrated: in the first, the common piping is confined between the dual inlets and the collectors; in the second, the common piping is confined to between the collectors and the containers; and in the third system, the common piping is provided between the inlets and the collectors, and also between the collectors and the containers. In all systems, a common suction is provided to transport the goods from the inlets through the collectors to the containers.

7 Claims, 3 Drawing Figures

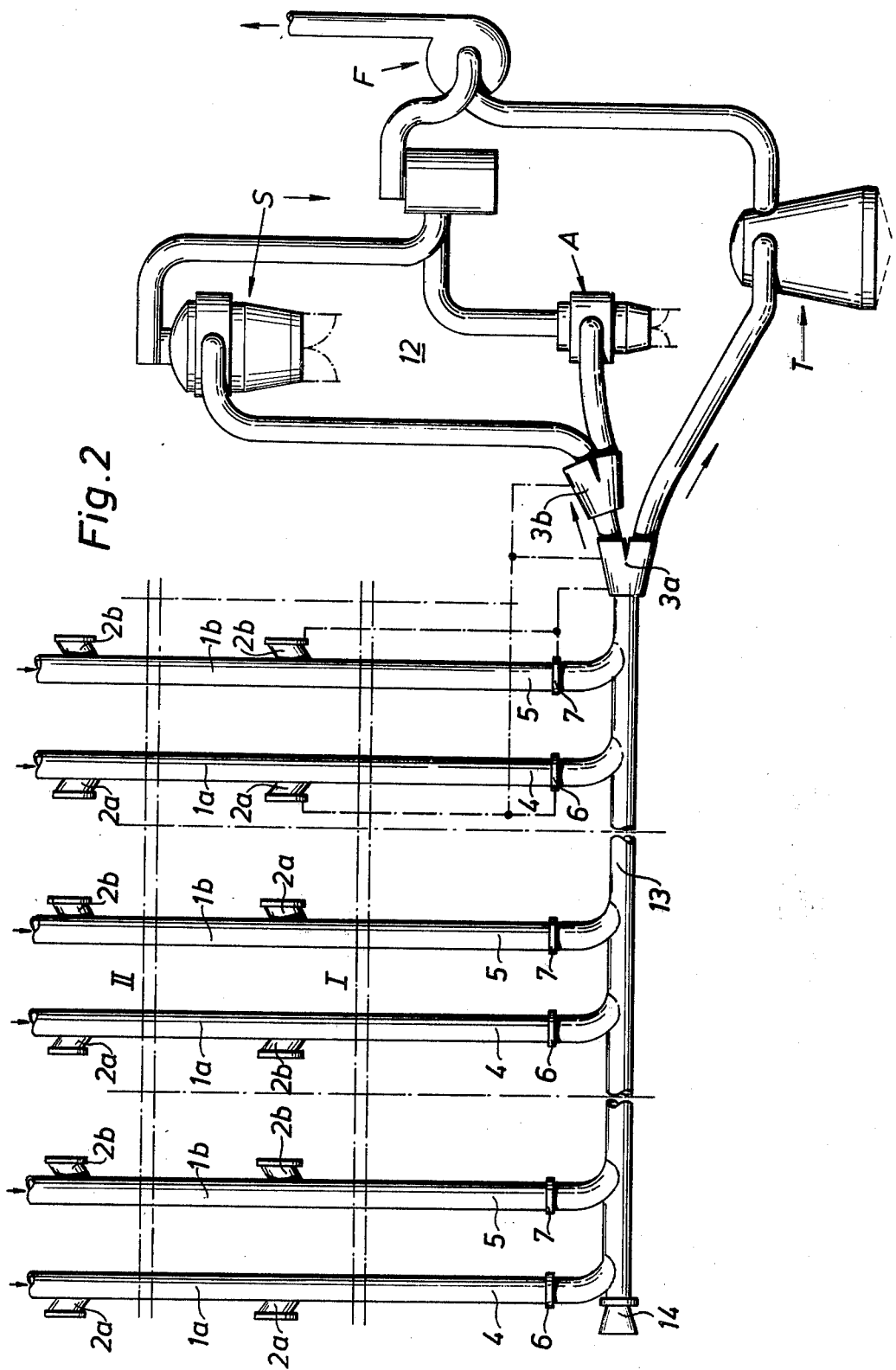

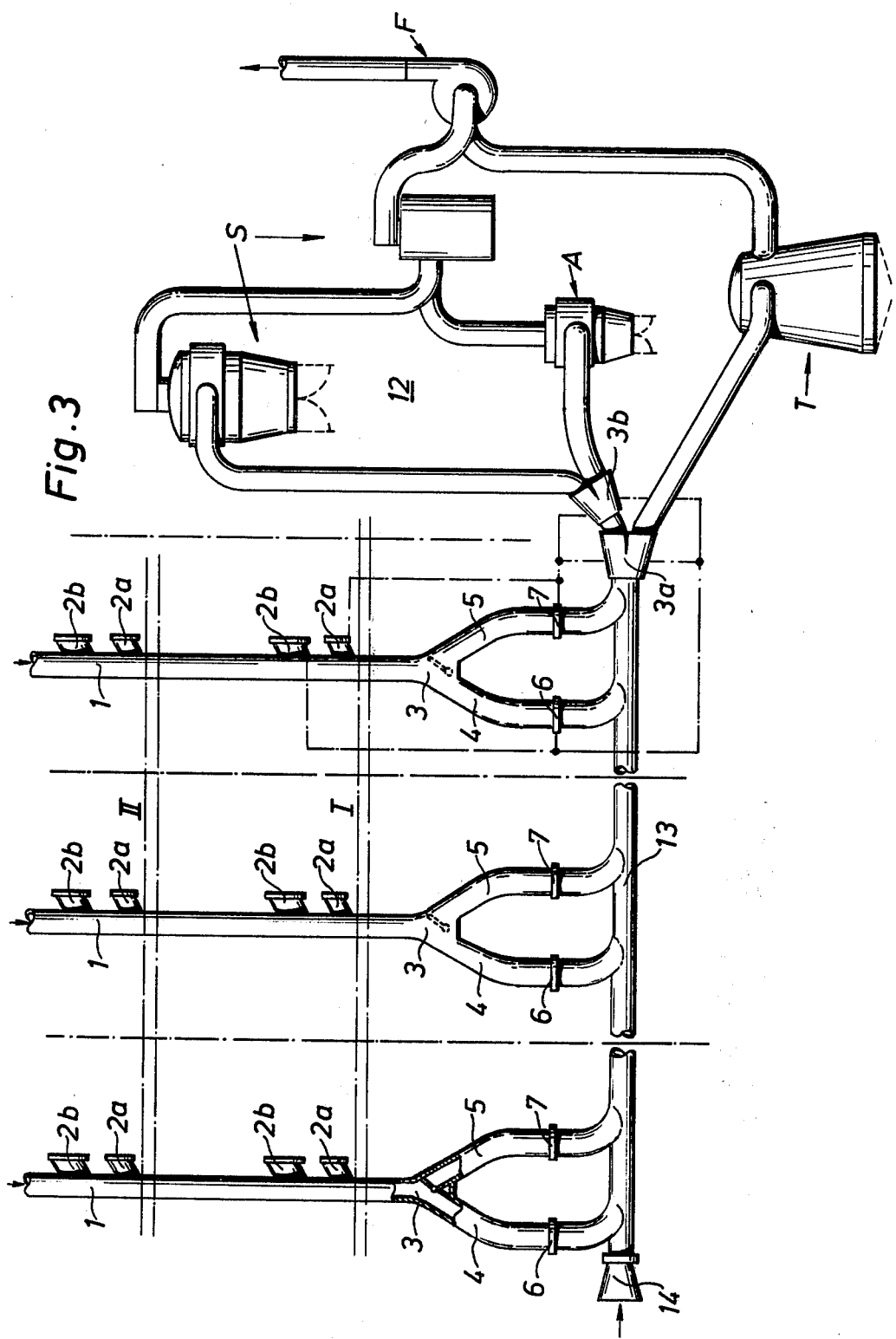

PNEUMATIC CONVEYING PIPE SYSTEM FOR COLLECTION AND INTERMITTENT CONVEYANCE OF DIFFERENT TYPES OF GOODS

This invention relates to a pneumatic conveying pipe system adapted to collect and intermittently convey goods of different kind, for example laundry and, respectively, waste material and/or refuse, from different buildings and stories, for example in hospitals, hotels and the like, to a central collecting station with different containers for further treatment of the different goods. Said conveying pipe system comprises chutes with covers for the different types of goods and conveying ducts leading to said containers in the collecting station.

For rationalizing and mechanizing the transportation in large buildings, such as hospitals, hotels, department stores, multistory apartment buildings and industrial buildings, pneumatic conveying installations have now come into use. Particularly in hospitals it is desirable for hygienic reasons to remove laundry, used implements and consumption articles such as rollers, bandages and the like, by pneumatic means. A pneumatic removal implies a desirable saving of personnel and at the same time prevents the personnel from contact with infected dressing materials, sheets, clothes, gloves which were used in conjunction with operations or the treatment of patients having infectious diseases. These implements belong to the abovementioned category of waste material. Also in the planning of new city districts consideration should be paid at an early stage to pneumatic removal of packaged goods, so that it will be possible to separate goods such as laundry which is to be taken care of in the collecting station from goods such as waste material, which are to be destroyed together with refuse, for example by combustion in a common or central plant, the heat from which can be utilized for the production of electricity, for heating purposes or for the preparation of hot water. In known installations, different pipe systems have been arranged in a known manner for laundry and, respectively, waste material. It has further been proposed, for producing the vacuum required for the conveyance through the two pipe systems, to employ one common fan equipment.

The present invention relates to different arrangements for simplifying the installation work, reducing the excavation and installation costs and to reduce the operation costs of installations of this kind for different types of goods.

According to the invention, an embodiment of a pneumatic conveying pipe system of the aforedescribed kind is characterized in that it comprises from each story a chute, which is common to the different types of goods and provided at its lower end with separate collecting spaces for the different types of goods, that said spaces are provided with bottom valves leading to a subsequent conveying duct, that between the chute and the respective collecting space a switch valve is provided, which is adapted to open an alternative conveying path for the respective kind of goods to the correct collecting space and through the conveying duct to the correct container, and to hermetically separate the other collecting space from the chute, and that means are provided to automatically control the switch valve in response to the operation of the corresponding loading hatch for the chute and, respectively, the bottom valve which has been opened.

A second collateral embodiment of the pneumatic conveying pipe system of the aforesaid kind according to the invention is characterized in that it comprises a conveying duct common to the different types of goods, and chutes from each story for the different types of goods, that the chutes are provided toward their lower ends with collecting spaces for respective types of goods, and the collecting spaces at their lower ends are provided with bottom valves leading to said common conveying duct, which at its end terminating at the collecting station is provided with one or more switch valves adapted to open an alternative conveying path for the respective kind of goods to the correct container for further treatment in the collecting station, and that means are provided for automatically controlling said switch valve or valves in response to the bottom valve which has been opened.

A preferred embodiment of the pneumatic conveying pipe system of the above kind according to the invention, which combines the advantages of both of the aforedescribed embodiments, is characterized in that it comprises from each story a chute, which is common to the different types of goods and provided at its lower end with separate collecting spaces, that said collecting spaces are provided with bottom valves leading to a common conveying duct, that between said chute and the respective collecting space a switch valve is provided, which is adapted to open an alternative conveying path for the respective kind of goods to the correct collecting space, and to hermetically separate the other collecting space or spaces from the chute, that means are provided to automatically control the switch valve in response to the operation of the corresponding loading hatch for the chute and, respectively, the bottom valve which has been opened, and to automatically hold the bottom valve for one collecting space (one type of goods) closed when the bottom valve for the other collecting space or spaces (other type or types of goods) has been opened, and vice versa, and that the conveying duct at its terminating end is provided with one or more switch valves to open an alternative conveying path for the respective kind of goods to the correct container for further treatment in the collecting station in response to the bottom valve which has been opened.

The invention is described in greater detail in the following, with reference to the accompanying drawings in which FIG. 1 shows an assembly of a pneumatic conveying pipe system comprising a common chute and two conveying ducts for two types of goods and a collecting station with containers for the different types of goods, FIG. 2 shows an assembly of a pneumatic conveying pipe system comprising a common conveying duct and two chutes for two types of goods and a collecting station with containers for the different types of goods, and FIG. 3 shows an assembly of a pneumatic conveying pipe system comprising a common chute in combination with a common conveying duct for two different types of goods and a collecting station with containers for the different types of goods.

1, 1a and 1b in the Figures designate chutes from different stories I, II, III, IV etc., with loading hatches 2a, 2b for different types of goods, for example laundry and, respectively waste material and/or refuse. 3 designates a switch valve between such chutes and the collecting spaces 4 and, respectively, 5 for different types of goods. Said collecting spaces are equipped with bottom valves 6 and, respectively, 7 and by means of soft bends lead to a common conveying duct 13 (FIG. 2 and FIG. 3) or separate conveying ducts 8 and 9 (FIG. 1) 3a and, respectively, 3b designate a switch valve — when one common conveying duct is applied — which is adapted to open the correct alternative conveying path for the different types of goods to the correct container T and, respectively, A or S located in a central collecting station 12 for further treatment of the different types of goods. Each of the conveying ducts 8, 9 and, respectively, 13 is provided with a damper-controlled air intake 10, 11 and, respectively, 14 at its peripheral part, i.e. the part farthest away from the common fan F.

The conveying ducts 8, 9 and 13 are assumed to be located in underground culverts, which are provided with entry shafts and regularly arranged inspection covers (not shown) in a known manner. The conveying ducts may also be located in connecting passages in the basement of the buildings. The conveying ducts usually are pipes of smooth steel or of cast iron or stainless steel and often have substantial dimensions — of the diameter magnitude 500 mm — and considerable length. Therefore, particularly the embodiments shown in FIG. 2 and FIG. 3 imply great economic advantages by lower excavation and installation costs. The constructions according to FIG. 1 and FIG. 3 offer in like manner advantages from a technical and economic point of view, because this type of installation with a common chute for different types of goods requires less space in the walls and at the passages through the floor construction in the different stories. As also the chutes have substantial cross-sectional dimensions, the possibility of providing the installations with one common chute for different types of goods implies that the building structure will be weakened less by the arrangement of holes.

The dash-dotted lines in the drawings indicate schematically such means and lines which are used for control of the switch valves in response to the loading hatches and, respectively, bottom valves to alternative positions for the correct conveying path through the installation all the way to the correct container in the collecting station. The means applied to this function may be mechanic or electric or pneumatic elements known per se. For adjusting the switch valves, electric or pneumatic motors are used.

I claim:

1. In a pneumatic pipe conveying system for conveying a plurality of different classes of goods from a corresponding plurality of sets of inlet port means to a corresponding plurality of remote receiving container means so that each of said classes of goods from each of said sets of inlet port means is conveyed to a corresponding respective one of said container means, said system comprising a valved pipe system extending from each of said inlet port means to said container means and means for applying a gas pressure differential to at least a portion of said valved pipe system to effect said conveying, the improvement wherein:

said valved pipe system comprises downwardly-extending branch chutes each connected with said inlet port means of more than one of said sets so as to receive goods of said different classes at different times; a plurality of collecting spaces at the lower ends of each of said chutes; a bottom valve for each of said collecting spaces, whereby when any of said bottom valves is closed goods delivered thereto from the corresponding one of said chutes are accumulated in the corresponding one of said collecting spaces above the closed valve; pneumatic conveying pipes connecting said bottom valves with said container means, for receiving accumulated goods from any one of said bottom valves which is open and for conveying said received goods to said container means; a plurality of branch switch valve means each positioned between one of said chutes and its associated collecting spaces and controllable to permit delivery of each class of said goods only to a particular one of said associated collecting spaces; and means for controlling each of said branch switch valve means as a function of which set of said inlet port means of the corresponding chute is being supplied with goods to route each class of said goods to only said particular one of said collecting spaces, and for controlling said bottom valves to close each of them when its corresponding collecting space is being supplied with said goods through the corresponding chute;

said pneumatic conveying pipes comprising a first pipe for receiving and conveying goods only from those of said bottom valves which accumulate one of said classes of goods and a second pipe for receiving and conveying goods only from those of said bottom valves which accumulate another of said classes of goods;

one of said classes of goods comprising two subclasses of goods, at least one of said remote container means comprising two containers one for each of said subclasses of goods, said system also comprising a further switch valve means for routing goods from said first pipe to one or the other of said two containers depending upon the controlled state of said further switch valve means; and means for controlling said further switch valve means in accordance with the subclass of goods being conveyed through said first pipe, thereby to effect conveyance of each of said subclasses of goods to the proper one of said two containers.

2. In a pneumatic pipe conveying system for conveying a plurality of different classes of goods from a corresponding plurality of sets of inlet port means to a corresponding plurality of remote receiving container means so that each of said classes of goods from each of said sets of inlet port means is conveyed to a corresponding respective one of said container means, said system comprising a valved pipe system extending from each of said inlet port means to said container means and means for applying a gas pressure differential to at least a portion of said valved pipe system to effect said conveying, the improvement wherein:

said valved pipe system comprises downwardly-extending branch chutes each connected with said inlet port means of more than one of said sets so as to receive goods of said different classes at different times; a plurality of collecting spaces at the lower ends of each of said chutes; a bottom valve for each of said collecting spaces, whereby when any of said bottom valves is closed goods delivered thereto from the corresponding one of said chutes are accumulated in the corresponding one of said collecting spaces above the closed valve; pneumatic conveying pipes connecting said bottom valves with said container means, for receiving accumulated goods from any one of said bottom valves which is open and for conveying said received goods to said container means; a plurality of branch switch valve means each positioned between one of said chutes and its associated collecting spaces and controllable to permit delivery of each class of said goods only to a particular one of said associated collecting spaces; and means for controlling each of said branch switch valve means as a function of which set of said inlet port means of the corresponding chute is being supplied with goods to route each class of said goods to only said particular one of said collecting spaces, and for controlling said bottom valves to close each of them when its corresponding collecting space is being supplied with said goods through the corresponding chute;

said pneumatic conveying pipes comprising a single pipe for receiving and conveying goods from all of said bottom valves, additional switch valve means connecting said single pipe to said plurality of container means and operable to route goods conveyed by said single pipe to one or another of said container means depending upon the controlled state of said additional switch valve means, and means for controlling said additional switch valve means in accordance with which class of said goods is being conveyed through said single pipe;

one of said classes of goods comprising two subclasses of goods, at least one of said remote container means comprising two containers one for each of said subclasses of goods, said system comprising further switch valve means connecting said additional switch valve means to said two containers and means for controlling said further switch valve means in accordance with the subclass of said goods being conveyed to said further switch valve means from one of said bottom valves.

3. In a pneumatic conveying pipe system for collecting and conveying a first class of goods comprising laundry and a second class of goods comprising waste material for disposal or recycling, from corresponding first and second sets of inlet port means to corresponding first and second remote receiving container means so that said first and second classes of goods are conveyed to corresponding respective ones of said container means, said system comprising a valved pipe system extending from each of said inlet port means to said container means and means for applying a gas pressure differential to at least a portion of said valve pipe system to effect said conveying, the improvement wherein:

said valved pipe system comprises a plurality of downwardly-extending branch chutes each connected with said inlet port means of both of said sets so as to receive goods of said first and second classes at different times;

a pair of separate collecting spaces at the lower ends of each of said chutes, one for collecting said laundry and one for collecting said waste material;

bottom valve means at the bottom of each of said collecting spaces, whereby when any of said bottom valve means is closed goods delivered to the associated collecting spaces are collected in said associated collecting space;

a plurality of branch switch valve means each positioned between one of said chutes and its associated collecting spaces and controllable to permit delivery of each of said classes of goods from each chute only to a particular one of said collecting spaces, thereby to accumulate said classes of goods in different collecting spaces when the corresponding bottom valve means is closed;

pneumatic conveying pipes connecting said bottom valve means to said container means for conveying goods from any of said bottom valve means which is open, to said container means; and control means connected to said branch switch valve means, said bottom valve means and said inlet port means for controlling each of said branch switch valve means as a function of which set of said inlet port means of the corresponding chute is being supplied with goods to route eacn of said classes of goods to said particular one of said collecting spaces, and for controlling said bottom valve means to close each of them when its corresponding space is being supplied with said goods through said chute and to open each of them when the goods in the corresponding collecting space are to be delivered to said container means.

4. The system of claim 3, in which said pneumatic conveying pipes comprise a first pipe for receiving and conveying goods from only those of said bottom valve means which when closed cause accumulation of a particular one of said classes of goods, and a second pipe for receiving and conveying goods from only those of said bottom valve means which when closed cause accumulation of the other of said classes of goods.

5. The system of claim 3, in which said pneumatic conveying pipes comprise:

a single pipe for receiving and conveying goods from all of said bottom valve means;

additional switch valve means connecting said single pipe to said plurality of container means and operable to route goods conveyed to said single pipe to one or another of said container means depending upon the controlled state of said additional switch valve means; and means for controlling said additional switch valve means in accordance with which class of said goods is being conveyed through said single pipe.

6. The system of claim 3, in which said branch switch valve means are operable to seal off pneumatically those of said collecting spaces other than the collecting spaces to which they are routing goods at any given time.

7. In a pneumatic pipe conveying system for conveying a plurality of different classes of goods from a corresponding plurality of sets of inlet port means to a corresponding plurality of remote receiving container means so that each of said classes of goods from each of said sets of inlet port means is conveyed to a corresponding respective one of said container means, one of said classes comprising laundry and another of said classes comprising waste material, said system comprising a valved pipe system extending from each of said inlet port means to said container means and means for applying a gas pressure differential to at least a portion of said valved pipe system to effect said conveying, the improvement wherein:

said valved pipe system comprises a plurality of downwardly-extending branch chutes connected with each of said inlet port means to receive said goods therefrom, a plurality of collecting spaces at the lower ends of said chutes and a bottom valve for each of said collecting spaces whereby when any of said bottom valves is closed goods delivered thereto from said inlet port means can be accumulated in the collecting space above it, pneumatic conveying pipes connected with said bottom valves for receiving said accumulated goods from any of said collecting spaces the bottom valve for which is open, and means for controlling the operation of said valved pipe system including said bottom valves to accumulate only one of said classes of goods at a time in any of said collecting spaces and to convey said different classes of goods through said valved pipe system to the respective container means for said classes of goods, said valved pipe system comprising at least one pipe through which goods of more than one of said classes, including said laundry and said waste material, pass at different times in travelling from said inlet ports to their respective containers; each of said branch chutes being provided with inlet port means of only one of said sets, so as to be supplied with only one of said classes of goods, said pneumatic conveying pipes comprising a single pipe connected with all of said bottom valves to receive goods from all of said chutes and branch pipes for connecting said single pipe to different ones of said container means, said system also comprising additional valve means connected between said single pipe and said branch pipes for routing said goods from said single pipe to the corresponding respective container means for the type of goods being conveyed through said single pipe, and means for coordinating the action of said additional valve means and of said bottom valves so that when any of said bottom valves is open said additional valve means is placed in the state which delivers the corresponding class of said goods to the proper corresponding container means.

* * * * *